United States Patent
Kishimoto

(10) Patent No.: US 12,090,604 B2
(45) Date of Patent: Sep. 17, 2024

(54) SHOT PEENING APPARATUS

(71) Applicant: HONDA MOTOR CO., LTD., Tokyo (JP)

(72) Inventor: Jun Kishimoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 381 days.

(21) Appl. No.: 17/583,260

(22) Filed: Jan. 25, 2022

(65) Prior Publication Data

US 2022/0250207 A1 Aug. 11, 2022

(30) Foreign Application Priority Data

Feb. 10, 2021 (JP) ................. 2021-020162

(51) Int. Cl.
| | | |
|---|---|---|
| *B24C 1/10* | (2006.01) | |
| *B01D 21/26* | (2006.01) | |
| *B01F 25/00* | (2022.01) | |
| *B04B 7/00* | (2006.01) | |

(52) U.S. Cl.
CPC ............. *B24C 1/10* (2013.01); *B01D 21/26* (2013.01); *B01F 25/00* (2022.01); *B04B 7/00* (2013.01); *B01D 2221/14* (2013.01)

(58) Field of Classification Search
CPC ............ B01D 21/26; B01F 25/00; B24C 1/10
USPC ................ 210/512.1, 512.3, 787; 451/87, 88
See application file for complete search history.

(56) References Cited

U.S. PATENT DOCUMENTS

| | | | |
|---|---|---|---|
| 4,330,968 A | 5/1982 | Kobayashi et al. | |
| 5,102,229 A | 4/1992 | Wada et al. | |
| 8,221,633 B2 * | 7/2012 | Lam .................... | B01D 17/085 |
| | | | 244/135 R |
| 2014/0329444 A1 | 11/2014 | Yamamoto | |
| 2015/0290770 A1 | 10/2015 | Ishikawa et al. | |

FOREIGN PATENT DOCUMENTS

| | | | |
|---|---|---|---|
| CN | 103286696 A | * | 9/2013 |
| CN | 103702799 | | 4/2014 |
| CN | 103958128 | | 7/2014 |
| JP | 2000153123 A | * | 6/2000 |
| JP | 2019-107735 | | 7/2019 |
| WO | 2020/158305 | | 8/2020 |

OTHER PUBLICATIONS

English Machine Translation JP-2000153123-A (Year: 2000).*
English Machine Translation CN-103286696-A (Year: 2013).*
Chinese Office Action and Search Report for Chinese Patent Application No. 202210133627.9 dated Apr. 26, 2023.

* cited by examiner

*Primary Examiner* — Sarang Afzali
(74) *Attorney, Agent, or Firm* — Amin, Turocy & Watson, LLP

(57) ABSTRACT

A shot peening apparatus includes a first tank. The first tank includes a swirl flow generating mechanism and a suction port. The swirl flow generating mechanism swirls a waste liquid in the circumferential direction. The suction port is disposed at the axial center of the first tank. The suction port opens toward a bottom wall and suctions the waste liquid. A plurality of blade members are provided inside the first tank. The plurality of blade members hinders the waste liquid from swirling in the first tank.

3 Claims, 4 Drawing Sheets

SHOT PEENING APPARATUS

CROSS-REFERENCE TO RELATED APPLICATIONS

This application is based upon and claims the benefit of priority from Japanese Patent Application No. 2021-020162 filed on Feb. 10, 2021, the contents of which are incorporated herein by reference.

BACKGROUND OF THE INVENTION

Field of the Invention

The present invention relates to a shot peening apparatus for performing a shot peening treatment by striking, with shot, a surface of a workpiece subjected to a thermochemical treatment.

Description of the Related Art

Conventionally, a shot peening apparatus that performs a shot peening treatment is known. The shot peening treatment is performed in order to improve mechanical properties (for example, fatigue strength) of a workpiece. In the shot peening treatment, the surface of the workpiece subjected to the thermochemical treatment is struck with shot such as glass beads.

In such a shot peening apparatus, glass beads bombard a surface of a workpiece together with high-pressure water. After the shot peening treatment on the workpiece is completed, waste liquid in which residues of the crushed glass beads and the high-pressure water are mixed is separated by a separation device. The separation device separates the waste liquid into a liquid component and a solid component. The high-pressure water separated and cleaned by the separation device is reused for the cleaned shot peening treatment.

For example, JP 2019-107735 A discloses a blasting apparatus that performs a blast treatment. The blasting apparatus is used to improve the strength of a surface of a workpiece as described above. The blasting apparatus blasts slurry onto the surface of a workpiece. The blasting apparatus has a blast gun and a net for placing a workpiece, inside a processing chamber. A storage tank for storing slurry is disposed at a lower end portion of the blasting apparatus.

When the blast treatment is performed on a workpiece, slurry is supplied to the blast gun and at the same time, high-pressure gas is pressure-fed. As a result, the slurry is accelerated by the pressure of the high-pressure gas, and the slurry is blasted onto the workpiece. As a result, the blast treatment such as polishing is performed on the surface of the workpiece. The slurry blasted toward the workpiece returns to the storage tank.

The slurry in the storage tank is stirred by a discharge pressure supplied from a bypass flow path. The slurry is supplied to the blast gun through a slurry pumping path by driving a pump. The slurry is supplied from the blast gun and reused in the next blast treatment.

SUMMARY OF THE INVENTION

However, in the blasting apparatus disclosed in JP 2019-107735 A, after the blast treatment is performed, the slurry in the storage tank is stirred, and the slurry is suctioned up through the slurry pumping path by the pump. At this time, in the storage tank, a swirl flow is generated by stirring the slurry by the discharge pressure. The swirl center of the swirl flow is recessed in a bowl shape toward the direction of gravity, and the liquid level at the swirl center is lower than the liquid level on the radially outer side. For this reason, for example, in a case where the slurry pumping path is disposed so as to face toward the swirl center of the swirl flow in the storage tank, it is not possible to efficiently suction up the slurry from the liquid surface lowered at the swirl center. As a result, the recovery efficiency of the slurry in the storage tank decreases.

An object of the present invention is to solve the above-described problem.

According to an aspect of the present invention, there is provided a shot peening apparatus including: an ejection mechanism that mixes shot and a liquid and ejects a mixture of the shot and the liquid onto a workpiece to perform a shot peening treatment; a tank that collects a waste liquid containing the shot and the liquid that have been ejected onto the workpiece; and a separation mechanism that separates the waste liquid collected in the tank into the shot and the liquid by centrifugal force and separately collects the separated shot and the separated liquid, wherein the tank includes:

a swirl flow generating mechanism disposed in a vicinity of an inner wall of the tank and configured to swirl the waste liquid collected inside the tank in a circumferential direction of the tank along the inner wall; and a supply mechanism disposed at an axial center of the tank and including a suction port that opens toward a bottom portion which is a lower portion of the tank, the suction port being configured to suction the waste liquid, the supply mechanism being configured to supply the waste liquid suctioned through the suction port, to the separation mechanism; and wherein, inside the tank, a hindering mechanism is disposed in a vicinity of the suction port and the hindering mechanism protrudes toward the inner wall to hinder swirling of the waste liquid.

According to the present invention, the shot peening apparatus can collect, in the tank, the waste liquid which is a mixture of the liquid and the shot that have been used in the shot peening treatment. When the waste liquid collected in the tank is swirled along the inner wall by the swirl flow generating mechanism in order to mix the shot, which is a solid component, and the liquid, the flow of the swirl flow at the swirling center is weakened by the hindering mechanism and thereby caused to stagnate. As a result, it is possible to suppress lowering of the liquid level at the swirling center, i.e., in the vicinity of the suction port.

As a result, by suppressing lowering of the liquid level of the waste liquid swirling in the tank, it is possible to reliably suction the waste liquid from the swirling center by the suction port of the supply mechanism and supply the waste liquid to the separation mechanism. As a result, it is possible to improve the recovery efficiency of the waste liquid from the tank, compared to a case where a hindering mechanism for hindering the swirling of the waste liquid is not provided.

The above and other objects, features and advantages of the present invention will become more apparent from the following description when taken in conjunction with the accompanying drawings in which preferred embodiments of the present invention are shown by way of illustrative example.

DESCRIPTION OF THE INVENTION

Figure 1:
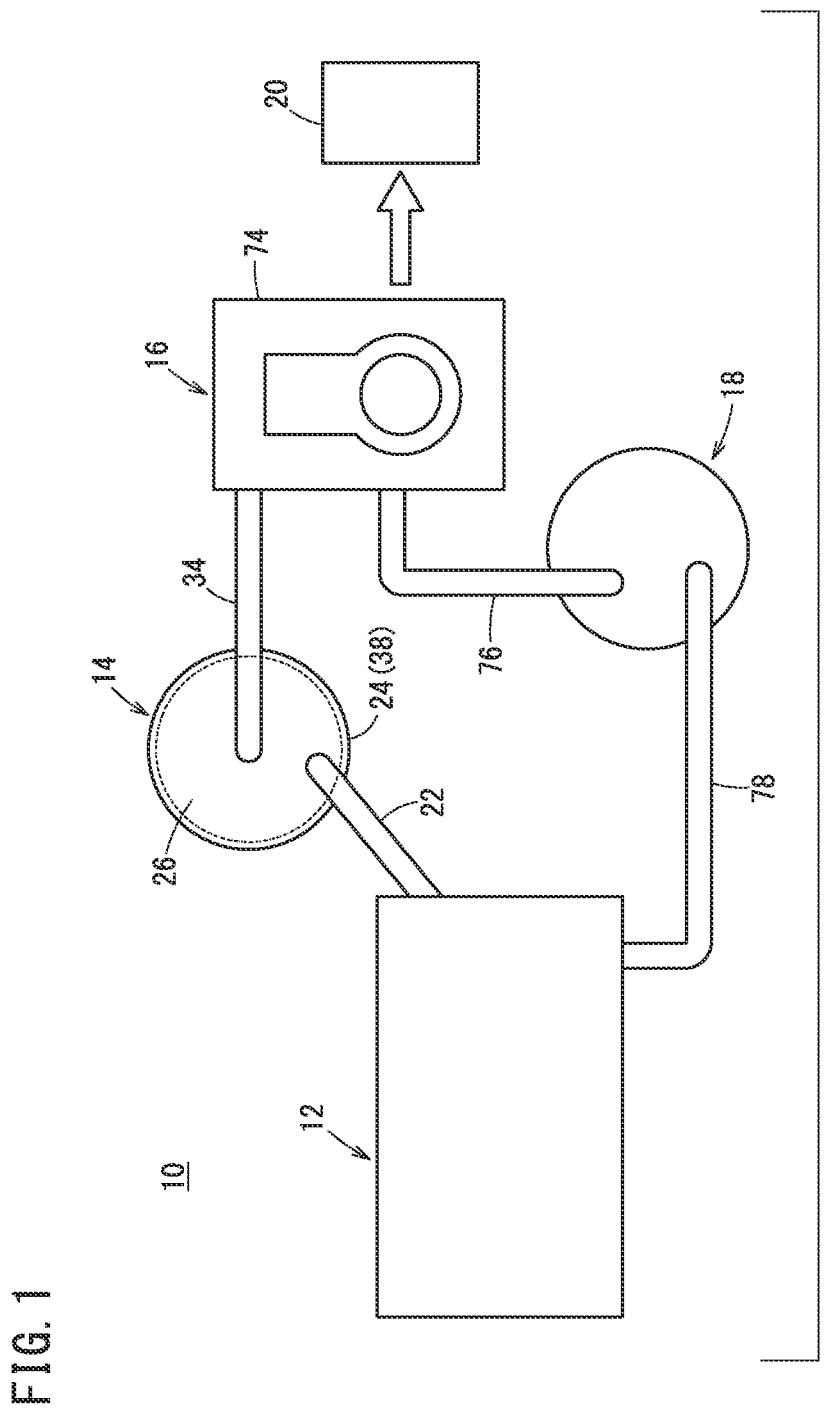
FIG. 1 is an overall schematic configuration diagram of a shot peening apparatus according to an embodiment of the present invention.

As shown in FIG. 1, a shot peening apparatus 10 includes an ejection mechanism (jetting mechanism) 12, a first tank (tank) 14, a separation mechanism 16, a second tank 18, and a recovery box 20. The ejection mechanism 12 ejects a mixed jet of glass beads as shot and water (liquid) to a workpiece (not shown). In the first tank 14, a waste liquid S (see FIG. 3), i.e., a mixture of water and crushed pieces derived from the crushed glass beads used in the ejection mechanism 12, is discharged and stored. The waste liquid S stored in the first tank 14 is supplied to the separation mechanism 16. The separation mechanism 16 separates the waste liquid S into crushed pieces and water. Water separated by the separation mechanism 16 is supplied to and stored in the second tank 18. The crushed pieces separated by the separation mechanism 16 are collected in the recovery box 20.

The ejection mechanism 12 includes an ejection gun (jet gun or shot peening gun) (not shown) therein. In the ejection mechanism 12, a plurality of glass beads are supplied from a glass bead supply mechanism (not shown) to the ejection gun. The ejection mechanism 12 supplies water supplied under pressure from a water supply mechanism (not shown) and water supplied from the second tank 18 to the ejection gun and ejects the water through the ejection gun. As a result, the ejection mechanism 12 mixes a predetermined amount of glass beads with water and blasts the mixture as a jet flow onto a surface of a workpiece. The first tank 14 is connected to the downstream side of the ejection mechanism 12 via a first pipe 22.

As shown in FIGS. 1 to 4, the first tank 14 has, for example, a circular shape when viewed from above. The first tank 14 includes a tank body 24, a cover member 26, a waste liquid supply pipe 28, a swirl flow generating mechanism 30, and a supply mechanism 32. The tank body 24 has a bottomed tubular shape and opens upward (in the direction of arrow A). The cover member 26 is attached to the upper end of the tank body 24 and closes the tank body 24. The waste liquid S discharged from the ejection mechanism 12 is supplied to the waste liquid supply pipe 28. The swirl flow generating mechanism 30 swirls and stirs the waste liquid S supplied into the first tank 14. The supply mechanism 32 supplies the waste liquid S to the separation mechanism 16 disposed downstream of the supply mechanism 32.

The first pipe 22 is connected to the first tank 14. The waste liquid S subjected to the shot peening treatment is supplied from the ejection mechanism 12 to the first pipe 22. A second pipe 34 is connected to the first tank 14. The second pipe 34 supplies the waste liquid S from the first tank 14 to the separation mechanism 16 disposed downstream of the first tank 14.

Figure 2:
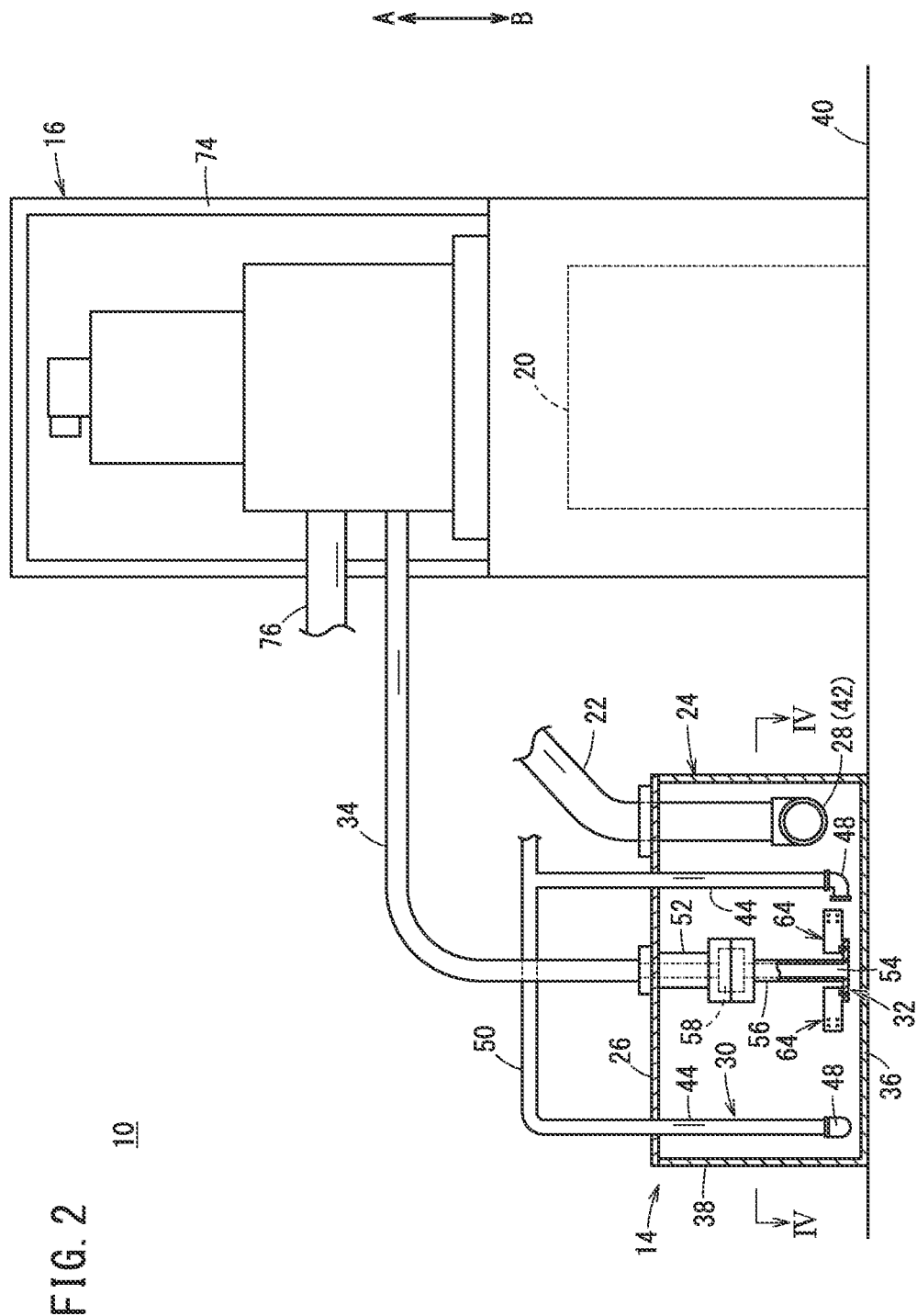
FIG. 2 is a front cross-sectional view of a separation mechanism and a first tank constituting the shot peening apparatus of FIG. 1.
Figure 3:
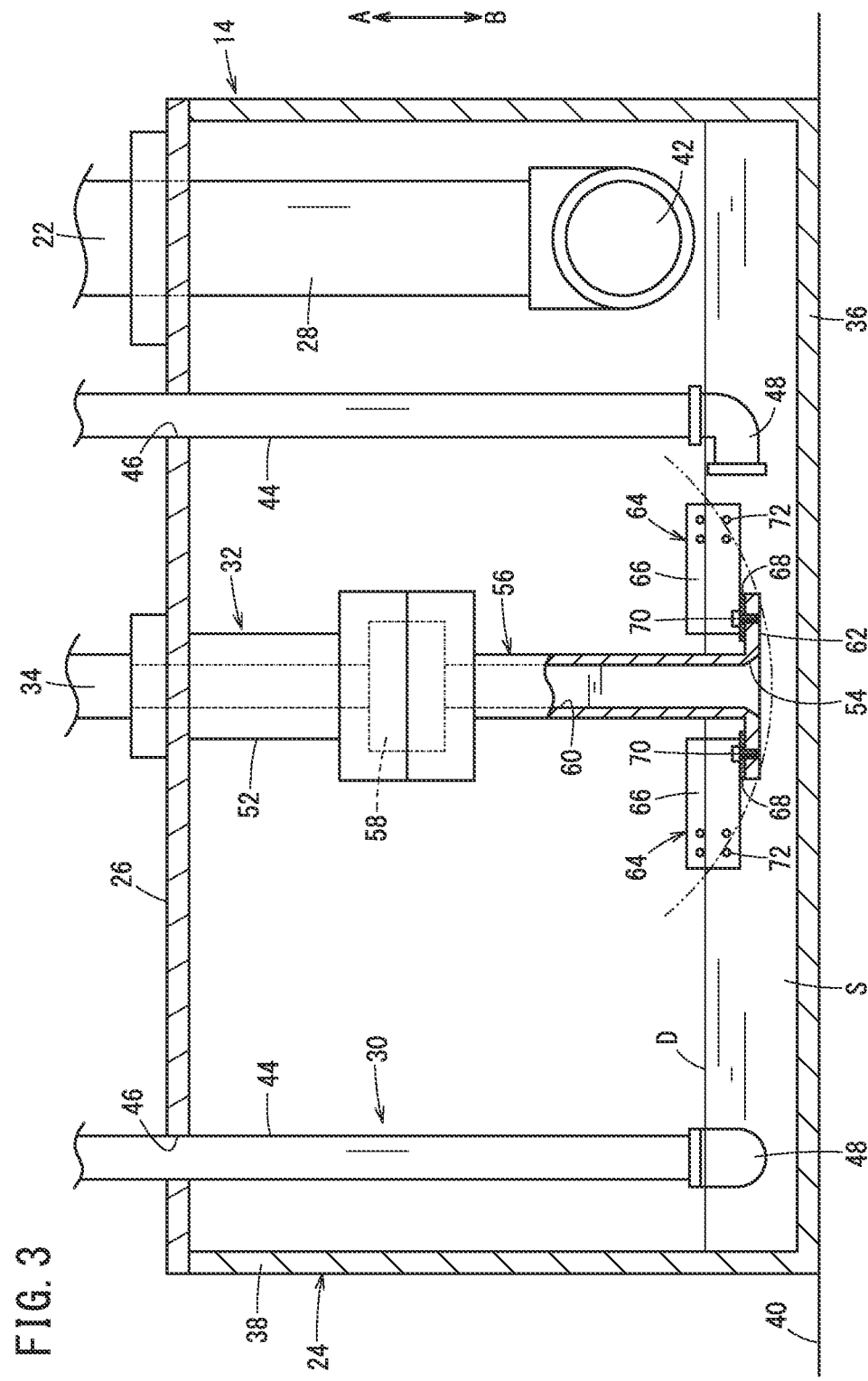
FIG. 3 is an enlarged cross-sectional view of the first tank in the shot peening apparatus of FIG. 2.
Figure 4:
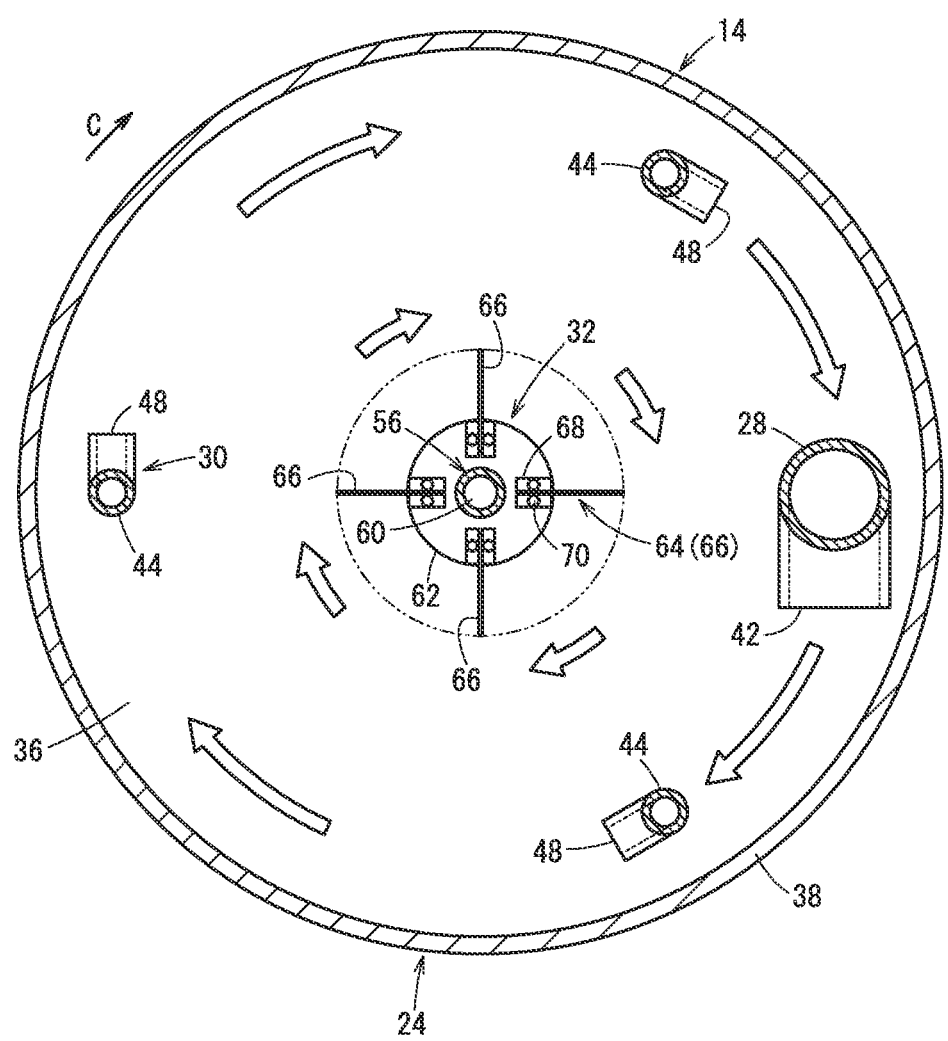
FIG. 4 is a cross-sectional view taken along line IV-IV of FIG. 2.

As shown in FIGS. 2 to 4, the tank body 24 includes a bottom wall (bottom portion) 36 and a peripheral wall (inner wall) 38. The bottom wall 36 has a circular disk shape. The peripheral wall 38 has an annular shape and is disposed on the outer peripheral edge of the bottom wall 36 so as to be orthogonal thereto. The bottom wall 36 of the tank body 24 is placed on a floor surface 40 or the like. Accordingly, the tank body 24 is disposed with the upper side (the arrow A direction) being open.

The cover member 26 has a circular disk shape having substantially the same diameter as the bottom wall 36. The cover member 26 is attached to an upper end of the peripheral wall 38 and covers the tank body 24. The inside of the first tank 14 is sealed by the cover member 26. Thus, a space having a predetermined volume is formed inside the first tank 14. A downstream end of the first pipe 22 is connected to the vicinity of an outer edge portion of the upper surface of the cover member 26. An upstream end of the second pipe 34 is connected to a central portion of the cover member 26. The second pipe 34 is connected to a supply mechanism 32 described later via the cover member 26.

The waste liquid supply pipe 28 is disposed in the vicinity of an outer edge portion of the first tank 14 that is spaced radially outward from an axial center (radial center) of the first tank 14. The waste liquid supply pipe 28 extends along the axial direction of the first tank 14 (the direction indicated by arrows A and B). The waste liquid supply pipe 28 is housed inside the tank body 24. An upper end of the waste liquid supply pipe 28 is connected to the first pipe 22 via the cover member 26. The waste liquid supply pipe 28 and the first pipe 22 communicate with each other. The waste liquid S generated in the ejection mechanism 12 is supplied from the ejection mechanism 12 through the first pipe 22 to the waste liquid supply pipe 28.

A lower end of the waste liquid supply pipe 28 is disposed near the bottom wall 36 of the tank body 24. The lower end of the waste liquid supply pipe 28 includes a supply portion 42. The supply portion 42 is bent and opened in a direction substantially orthogonal to the axial direction (directions of arrows A and B) of the waste liquid supply pipe 28. The supply portion 42 is substantially parallel to the bottom wall 36. The supply portion 42 is disposed so as to be oriented in the circumferential direction of the first tank 14. Here, a case will be described in which the supply portion 42 of the waste liquid supply pipe 28 is disposed in a clockwise direction (arrow C direction) when the first tank 14 is viewed from above, as shown in FIG. 4.

The swirl flow generating mechanism 30 stirs the waste liquid S stored in the first tank 14. The swirl flow generating mechanism 30 has a plurality of lead-out pipes 44. The plurality of lead-out pipes 44 are disposed, for example, at positions in the vicinity of the outer edge that are spaced radially outward from the axial center of the first tank 14. That is, the plurality of lead-out pipes 44 are disposed in the vicinity of the peripheral wall 38 of the first tank 14.

The lead-out pipes 44 extend along the axial direction (the directions of arrows A and B) of the first tank 14. A portion of each lead-out pipe 44 that extends from the lower end to the vicinity of the upper end is accommodated in the first tank 14. The upper end of the lead-out pipe 44 is inserted into a pipe hole 46 opened in the cover member 26. The upper end of the lead-out pipe 44 is exposed to an upper portion of the first tank 14 (cover member 26) through the pipe hole 46.

The plurality of lead-out pipes 44 are arranged at equal angular intervals along the circumferential direction of the first tank 14. The lower end of each lead-out pipe 44 is disposed in the vicinity of the bottom wall 36. Each lead-out pipe 44 has a lead-out portion 48. The lead-out portion 48 is bent in a direction substantially orthogonal to the axial direction of the lead-out pipe 44 and extends by a predetermined length. Each of the lead-out portions 48 is substantially parallel to the bottom wall 36. The lead-out portion 48 is disposed at a predetermined distance upward from the bottom wall 36. Each of the lead-out portions 48 is disposed in a direction along the circumferential direction of the first tank 14. The plurality of lead-out portions 48 face in the circumferential direction similarly to the supply portion 42 of the waste liquid supply pipe 28. The supply portion 42 of the waste liquid supply pipe 28 is disposed in the clockwise direction (the arrow C direction in FIG. 4). Here, as shown in FIG. 4, a case where three lead-out pipes 44 are provided in the first tank 14 will be described.

As shown in FIGS. 2 and 3, the upper ends of the plurality of lead-out pipes 44 are exposed to the outside of the first tank 14. The upper ends of the plurality of lead-out pipes 44 are connected to a common pipe 50. The common pipe 50 is connected to a water supply mechanism (not shown). Water is supplied from the water supply mechanism to the common pipe 50. Water is supplied to the plurality of lead-out pipes 44 through the common pipe 50. The water supplied to each of the lead-out pipes 44 is led out from each lead-out portion 48 into the first tank 14.

As shown in FIG. 4, the lead-out directions of the plurality of lead-out portions 48 are all the same in the clockwise direction (arrow C direction). Therefore, the water led out from the plurality of lead-out portions 48 generates a clockwise swirl flow in the first tank 14. Due to the clockwise swirl flow of the water, the waste liquid S stored in the first tank 14 also swirls clockwise.

Note that the direction of the swirl flow generated in the first tank 14 by the swirl flow generating mechanism 30 is not limited to the above-described clockwise direction (the arrow C direction). For example, the lead-out portion 48 of each lead-out pipe 44 may be oriented in the counterclockwise direction to thereby generate a counterclockwise swirl flow.

The supply mechanism 32 is disposed at the axial center of the first tank 14. The supply mechanism 32 extends in the up-down direction (directions of arrows A and B in FIGS. 2 and 3) along the axis of the first tank 14. The supply mechanism 32 includes a connection pipe 52 and a suction pipe 56. The connection pipe 52 is connected to the inner surface of the cover member 26. The suction pipe 56 is connected to a lower portion of the connection pipe 52. A lower end of the suction pipe 56 is provided with a suction port 54. A pump 58 is provided between the connection pipe 52 and the suction pipe 56. The pump 58 is accommodated inside the connection pipe 52 and the suction pipe 56. The pump 58 pumps up the waste liquid S in the first tank 14 through the suction pipe 56. An upper end of the connection pipe 52 and an upstream end of the second pipe 34 are connected to each other via the cover member 26. The connection pipe 52 and the second pipe 34 communicate with each other. Accordingly, the waste liquid S in the first tank 14 is suctioned from the suction port 54 of the supply mechanism 32. The waste liquid S is supplied to the second pipe 34 through the connection pipe 52.

The suction pipe 56 has a tubular shape and has thereinside a suction passage 60 extending along the axial direction (the direction of arrows A and B). The lower end of the suction pipe 56 includes a flange portion 62. The flange portion 62 is substantially parallel to the bottom wall 36 of the tank body 24. The flange portion 62 has a circular plate shape whose diameter increases radially outward from the suction pipe 56. The flange portion 62 is spaced upward from the bottom wall 36 by a predetermined distance. The center of the flange portion 62 is provided with the suction port 54. The suction port 54 opens downward (in the direction of arrow B) in the flange portion 62. The suction port 54 communicates with the suction passage 60.

As shown in FIGS. 2 to 4, a hindering mechanism having a plurality of blade members 64 is disposed on the flange portion 62. The plurality of blade members 64 suppress a swirl flow of the waste liquid S in the vicinity of the suction port 54. That is, the plurality of blade members 64 are a swirl flow suppressing mechanism capable of suppressing the swirl flow of the waste liquid S in the vicinity of the suction port 54. Here, a case where the hindering mechanism includes four blade members 64 will be described.

Each of the blade members 64 includes a blade wall 66 and a pair of attachment portions 68. The blade wall 66 has, for example, a substantially rectangular plate shape. Each of the pair of attachment portions 68 extends in a direction substantially orthogonal to the blade wall 66 at the lower end of the blade wall 66. The attachment portions 68 extend toward both sides in the width direction orthogonal to the extending direction of the blade wall 66. Each of the attachment portions 68 is disposed at one end of the blade wall 66 in the extending direction. Each of the attachment portions 68 is connected to a lower end of the blade wall 66.

Each of the attachment portions 68 includes a hole (not shown) into which a fixing bolt 70 is inserted. After each of the attachment portions 68 is brought into contact with the upper surface of the flange portion 62, a fixing bolt 70 is inserted into the hole (not shown) of each of the attachment portions 68. Next, the fixing bolt 70 is screw-engaged into the flange portion 62. Accordingly, each of the blade walls 66 is fixed to the upper surface of the flange portion 62 so as to be orthogonal to the flange portion 62. The blade members 64 are arranged at equal angular intervals along the circumferential direction of the flange portion 62. Thus, each of the blade walls 66 extends radially outward beyond the flange portion 62. A plurality of blade walls 66 are arranged radially when viewed from the axial direction of the suction pipe 56. One end of the blade member 64 in the extending direction is an end portion on the radially inner side, and is fixed to the flange portion 62. The other end of the blade member 64 in the extending direction is an end portion on the radially outer side, and is disposed so as to face toward the peripheral wall 38.

The blade wall 66 of the blade member 64 has a plurality of holes 72. The plurality of holes 72 are disposed in the vicinity of the other end (radially outer side) of each blade wall 66 in the extending direction. Each of the holes 72 penetrates the blade wall 66 in the thickness direction of the blade wall. After another plate member is brought into contact with the other end of the blade wall 66 in the extending direction, a connecting bolt (not shown) is inserted into the hole 72 to connect the plate member and the blade wall 66. Thus, the radially outward length of the blade member 64 can be extended by the plate member. As a result, for example, by attaching and detaching a plate member to and from the blade wall 66, the radial-direction length of the blade member 64 can be changed according to the size of the first tank 14. That is, the suppression range of the swirl flow in the first tank 14 by the blade member 64 can be changed.

As shown in FIGS. 1 and 2, the separation mechanism 16 is disposed downstream of the first tank 14. A downstream end of the second pipe 34 is connected to the separation mechanism 16. The separation mechanism 16 has a frame 74. The frame 74 has a predetermined height in the up-down direction (directions of arrows A and B). The frame 74 is placed on the floor surface 40 or the like. The separation mechanism 16 contains therein a separation chamber (not shown). The waste liquid S from the first tank 14 is supplied to the separation mechanism through the second pipe 34. In the separation mechanism 16, the waste liquid S is supplied to the separation chamber (not shown), the separation chamber is rotated. Thus, the waste liquid S in the separation chamber can be separated into water as a liquid component and crushed pieces as a solid component by the centrifugal force acting on the separation chamber. The separation mechanism 16 is, for example, a vertical centrifugal separator.

An upstream end of a third pipe 76 is connected to an inner peripheral surface of the separation chamber. Water, which is a liquid component separated from the waste liquid S, flows through the third pipe 76. A downstream end of the third pipe 76 is connected to the second tank 18.

As shown in FIG. 1, the second tank 18 has, for example, a circular shape when viewed from above. The second tank 18 has a hollow shape having a space of a predetermined volume therein. The second tank 18 is disposed downstream of the separation mechanism 16. The second tank 18 is connected to the separation mechanism 16 by the third pipe 76. Clean water that is a liquid component separated from the waste liquid S is supplied to the second tank 18 through the third pipe 76. Thus, clean water is stored in the second tank 18.

The second tank 18 is connected to the ejection mechanism 12 by a fourth pipe 78. The clean water stored in the second tank 18 is supplied to the ejection mechanism 12 through the fourth pipe 78. The clean water is reused by the ejection mechanism 12 when the next shot peening treatment is performed.

As shown in FIGS. 1 and 2, the recovery box 20 has a hollow box shape that is open upward (in the direction of arrow A). In the frame 74, the recovery box 20 is disposed below (in the direction of arrow B) the separation mechanism 16 in the direction of gravity. After the waste liquid S is separated into water and crushed pieces in the separation chamber (not shown) of the separation mechanism 16, the crushed pieces (solidified matter or solidified material) are discharged and fall downward (in the direction of the arrow B) from the separation mechanism 16 by gravity. As a result, the solid matter, which is crushed pieces, is accommodated inside the recovery box 20. The solidified matter is disposed of without being reused.

Next, the operation and effects of the shot peening apparatus 10 will be described.

First, in the ejection mechanism 12, a workpiece is placed at a position facing an ejection gun (not shown). Next, a plurality of glass beads are supplied from a glass bead supply mechanism (not shown) to the ejection gun. Simultaneously with the glass beads, water supplied from the water supply mechanism (not shown) and water supplied from the second tank 18 through the fourth pipe 78 are supplied to the ejection gun. As a result, the glass beads and water are mixed inside the ejection gun, and the mixture is ejected as a jet flow from the ejection gun onto the surface of the workpiece.

The jet flow is ejected from the ejection gun to a desired portion on the surface of the workpiece and collides against the desired portion. Thus, residual stress is applied to the surface of the workpiece by the jet flow. The glass beads are crushed upon impact on the workpiece. The crushed pieces of the crushed glass beads are pressed against the surface of the work by water jetted toward the workpiece. As a result, the desired portion of the surface of the workpiece is subjected to the shot peening treatment.

After a predetermined time has elapsed since the above-described shot peening treatment has been performed, supply of water from the water supply mechanism (not shown) to the ejection gun is stopped. At the same time, the supply of glass beads from the glass bead supply mechanism to the ejection gun is also stopped. As a result, ejecting of the jet flow from the ejection mechanism 12 to the workpiece is stopped.

The crushed pieces of glass beads crushed as the result of the shot peening are mixed with water to form the waste liquid S. The waste liquid S is discharged from the ejection mechanism 12 to the first tank 14 through the first pipe 22. The waste liquid S is supplied from the supply portion 42 of the waste liquid supply pipe 28 into the first tank 14. As shown in FIG. 4, in the first tank 14, the waste liquid S is led out from the supply portion 42 in a clockwise direction (arrow C direction) along the circumferential direction.

At the same time as the waste liquid S is supplied into the first tank 14, water is supplied from the water supply mechanism (not shown) to each of the lead-out pipes 44 through the common pipe 50. Water is led out into the first tank 14 from the lead-out portion 48 of each of the lead-out pipes 44. The lead-out portions 48 of the plurality of lead-out pipes 44 are disposed in the first tank 14 so as to be oriented in the clockwise direction, which is the same swirling direction. Therefore, a clockwise (arrow C direction) swirl flow is generated in the first tank 14 by water led out from the lead-out portions 48 into the first tank 14. As a result, the waste liquid S flows in the first tank 14 while swirling clockwise together with the water supplied from the lead-out portions 48.

As described above, the swirl flow generating mechanism 30 swirls the waste liquid S, which is a mixture of water as a liquid component and crushed pieces as a solid component, along the peripheral wall 38 inside the first tank 14. This prevents crushed pieces having a large specific gravity contained in the waste liquid S from settling out on the bottom wall 36 inside the first tank 14. The waste liquid S is suitably stirred inside the first tank 14. Therefore, the first tank 14 can store the crushed pieces and water in a mixed state at all times.

Next, after a predetermined amount or more of the waste liquid S is stored inside the first tank 14, operation of the pump 58 of the supply mechanism 32 is started. Thus, the waste liquid S in the first tank 14 is suctioned into the suction passage 60 from the suction port 54 of the suction pipe 56 by the pump 58. The waste liquid S rises along the suction pipe 56 and the connection pipe 52, and then is supplied to the separation mechanism 16 through the second pipe 34.

At this time, as shown in FIG. 3, the turning center of the waste liquid S that is swirled and stirred in the first tank 14 is in the vicinity of the suction port 54. There are cases where the liquid level D of the waste liquid S at the swirling center may be lower than the liquid level of the waste liquid S in the vicinity of the peripheral wall 38. More specifically, there is a case where the liquid level D of the waste liquid S at the swirling center may be recessed downward (in the direction of arrow B), i.e., in the direction of gravity, to form a bowl shape (see a two-dot chain line shape in FIG. 3). At this time, since the blade walls 66 of the blade members 64 are disposed in the waste liquid S, the swirl flow of the waste liquid S in the vicinity of the suction port 54 is hindered by the blade wall 66. For this reason, the flow velocity of the waste liquid S in the vicinity of the swirling center decreases due to the presence of the blade walls 66, and the flow of the waste liquid S stagnates.

Therefore, lowering of the liquid level D of the waste liquid S in the vicinity of the suction port 54 is suppressed by the blade members 64. In the central portion of the first tank 14 near the suction port 54, the liquid level D of the waste liquid S does not form a bowl shape recessed downward. Thus, the liquid level D at the swirling center of the waste liquid S can be maintained substantially horizontal. As a result, even when the remaining amount of the waste liquid S in the first tank 14 is reduced and the liquid level D is lowered, the liquid level D of the waste liquid S can be maintained substantially horizontal in the vicinity of the suction port 54. Therefore, the waste liquid S can be reliably suctioned from the suction port 54 and supplied to the separation mechanism 16.

After the waste liquid S is supplied to the separation chamber of the separation mechanism 16 through the second pipe 34, a rotating body (not shown) having the separation chamber rotates. As a result, the waste liquid S is separated into water, which is a liquid component having a different specific gravity, and a solidified matter, which is a solid component composed of crushed pieces, by the centrifugal force acting on the rotating body. The separated water is discharged to the second tank 18 through the third pipe 76 connected to the separation chamber. On the other hand, the solidified matter formed of the crushed pieces is scraped off from the wall surface of the separation chamber after the rotating body (not shown) is stopped. The solidified matter is discharged from the separation chamber and falls from the separation mechanism 16 into the recovery box 20. Thus, the solidified matter is collected in the recovery box 20.

The above-described step of discharging the solidified matter from the separation chamber is performed with the supply of the waste liquid S from the first tank 14 to the separation mechanism 16 being temporarily stopped. That is, the waste liquid S discharged by the ejection mechanism 12 cannot be continuously supplied from the ejection mechanism 12 to the separation mechanism 16. Therefore, the waste liquid S needs to be temporarily stored upstream of the separation mechanism 16. When the separation mechanism 16 is stopped, the waste liquid S is temporarily stored in the first tank 14.

The water separated by the separation mechanism 16 is supplied to the second tank 18 in a clean state in which the crushed pieces are separated and removed. The water is stored inside the second tank 18. When the shot peening treatment on the next workpiece is performed in the ejection mechanism 12, the clean water is supplied to the ejection gun through the fourth pipe 78 and is reused.

After a workpiece has been subjected to a shot peening treatment by the ejection mechanism 12, the discharged waste liquid S is separated into water and crushed pieces by the separation mechanism 16. The water is stored in the second tank 18 and can be reused. The solidified matter composed of the crushed pieces is discharged to the recovery box 20 and collected in the recovery box 20. Thus, one step of the shot peening treatment by the shot peening apparatus 10 is completed. After the above step is completed, the next shot peening treatment is performed in the shot peening apparatus 10.

As described above, in the present embodiment, when the shot peening treatment is performed on a workpiece, waste liquid S which is a mixture of the crushed pieces of the glass beads and water is discharged. The waste liquid S can be stored in the first tank 14. The first tank 14 includes the swirl flow generating mechanism 30, the suction port 54, and the supply mechanism 32. The swirl flow generating mechanism 30 is disposed near the peripheral wall 38 of the tank body 24. The swirl flow generating mechanism 30 swirls the waste liquid S supplied into the tank body 24, along the peripheral wall 38. The suction port 54 is disposed at the axial center of the first tank 14. The suction port 54 opens toward the bottom wall 36 of the tank body 24. The suction port 54 suctions the waste liquid S. The supply mechanism 32 supplies the waste liquid S suctioned from the suction port 54, to the separation mechanism 16. The plurality of blade members 64 are provided inside the first tank 14. Each of the blade members 64 is disposed on the flange portion 62 of the suction pipe 56 which is in the vicinity of the suction port 54. Each of the blade members 64 projects toward the peripheral wall 38 to hinder the flow of the waste liquid S at the swirling center.

Therefore, the waste liquid S collected in the first tank 14 is swirled along the peripheral wall 38 by the swirl flow generating mechanism 30, so that water as a liquid component and crushed pieces as a solid component are suitably mixed. At this time, in the first tank 14, the plurality of blade members 64 protruding from the suction pipe 56 at the axial center toward the peripheral wall 38 are disposed in the waste liquid S. As a result, in the first tank 14, the swirl flow of the waste liquid S in the vicinity of the suction port 54 is weakened. Therefore, the flow of the waste liquid S stagnates in the vicinity of the suction port 54. This prevents the liquid level D at the swirling center of the waste liquid S from forming a bowl shape that is recessed downward (in the direction of arrow B). The liquid level D at the swirling center of the waste liquid S can be kept substantially horizontal.

As a result, even when the remaining amount of the waste liquid S in the first tank 14 becomes small and the liquid level D of the waste liquid S drops, the liquid level D at the swirling center of the waste liquid S in the vicinity of the suction port 54 can be kept substantially horizontal. Thus, the waste liquid S can be reliably suctioned from the suction port 54 and supplied to the separation mechanism 16. Therefore, compared to a case where the blade member 64 is not provided, it is possible to improve the recovery efficiency of the waste liquid S from the first tank 14.

The plurality of blade members 64 are separated from each other along the circumferential direction of the first tank 14. The blade members 64 are plate pieces disposed on the flange portion 62 of the suction pipe 56. For this reason, in the first tank 14, the flow of the swirl flow of the waste liquid S in the vicinity of the suction port 54 (suction pipe 56) can be weakened and caused to stagnate, with a simple configuration. Therefore, a substantially horizontal liquid level D of the waste liquid S can be maintained at the swirling center inside the first tank 14. As a result, the waste liquid S can be reliably suctioned into the suction port 54 (suction pipe 56).

The plurality of blade members 64 are disposed above the suction port 54 (in the direction of arrow A), which is the direction opposite to the direction of gravity. Therefore, in the first tank 14, in a state in which the liquid level D of the waste liquid S is above the suction port 54 (in the arrow A direction), the flow of the waste liquid S at the swirling center can be weakened and caused to stagnate. As a result, the swirl flow in the vicinity of the suction port 54 can be stably suppressed until the liquid level D of the waste liquid S becomes substantially the same level as the suction port 54. Therefore, until the liquid level D of the waste liquid S reaches a level close to the suction port 54, it is possible to suppress the swirl flow of the waste liquid S and suction the waste liquid S from the suction port 54. As a result, the recovery efficiency of the waste liquid S through the suction port 54 can be enhanced.

The above embodiment can be summarized as follows.

According to the above embodiment, there is provided a shot peening apparatus (10) including: an ejection mechanism (12) that mixes shot and a liquid and ejects a mixture of the shot and the liquid onto a workpiece to perform a shot peening treatment; a tank (14) that collects a waste liquid (S) containing the shot and the liquid that have been ejected onto the workpiece; and a separation mechanism (16) that separates the waste liquid collected in the tank into the shot and the liquid by centrifugal force and separately collects the separated shot and the separated liquid, wherein the tank includes:

a swirl flow generating mechanism (30) disposed in a vicinity of an inner wall (38) of the tank and configured to swirl the waste liquid collected inside the tank in a circumferential direction of the tank along the inner wall; and a supply mechanism (32) disposed at an axial center of the tank and including a suction port (54) that opens toward a bottom portion (36) which is a lower portion of the tank, the suction port being configured to suction the waste liquid, the supply mechanism being configured to supply the waste liquid suctioned through the suction port, to the separation mechanism; and wherein, inside the tank, a hindering mechanism (64) is disposed in a vicinity of the suction port and the hindering mechanism protrudes toward the inner wall to hinder swirling of the waste liquid.

With the above configuration, in the first tank, the swirl flow of the waste liquid in the vicinity of the suction port is weakened by the hindering mechanism. Therefore, the flow of the waste liquid stagnates in the vicinity of the suction port. As a result, the liquid level of the waste liquid at the swirling center can be maintained substantially horizontal in the first tank, and the recovery efficiency of the waste liquid can be improved.

The hindering mechanism includes a plurality of plate pieces (64) arranged so as to be separated from each other along the circumferential direction of the tank. With the above, in the first tank, the flow of the swirl flow of the waste liquid in the vicinity of the suction port can be weakened and caused to stagnate, with a simple configuration. As a result, the waste liquid can be reliably suctioned into the suction port.

The hindering mechanism is disposed at a position above the suction port. With this configuration, in the first tank, when the liquid level of the waste liquid is above the suction port, the flow of the waste liquid at the swirling center can be weakened and caused to stagnate.

The present invention is not limited to the above-described embodiment, and various configurations can be adopted without departing from the essence and gist of the present invention. For example, in the present embodiment, a case has been described in which the first tank 14 is provided with three lead-out pipes 44, but the present invention is not limited thereto. For example, at least one lead-out pipe 44 may be provided in the first tank 14.

What is claimed is:

1. A shot peening apparatus comprising:
   a tank that collects a waste liquid containing shot and a liquid that have been ejected onto a workpiece to perform a shot peening treatment, wherein the shot peening apparatus discharges the waste liquid from the tank, separates the waste liquid into the shot and the liquid by centrifugal force, and separately collects the separated shot and the separated liquid,
   a swirl flow generating mechanism, within the tank, that includes a plurality of lead-out pipes that are disposed between an inner surface of a peripheral wall of the tank and a supply mechanism with an arrangement of the plurality of lead-out pipes spaced around a periphery of the supply mechanism, the plurality of lead-out pipes leading out the waste liquid into the tank, and the plurality of lead-out pipes being configured to swirl the waste liquid collected inside the tank in a circumferential direction of the tank along the inner surface;
   the supply mechanism including a suction pipe disposed, in the tank, at a position being a swirling center of swirl flow of the waste liquid within the tank, the suction pipe including a suction port that opens toward a bottom portion which is a lower portion of the tank, the suction port being configured to suction the waste liquid, and the supply mechanism being configured to suction the waste liquid into the suction pipe through the suction port provided at a lower end of the suction pipe and discharge the waste liquid from the tank; and
   a hindering mechanism disposed inside the tank, the hindering mechanism including a blade member that is disposed adjacent the suction port at a lower portion of the suction pipe, the blade member protruding toward the inner surface, and the hindering mechanism hindering swirling of the waste liquid along the circumferential direction of the tank.

2. The shot peening apparatus according to claim 1, wherein the hindering mechanism further includes one or more additional blade members, and wherein the blade member and the one or more additional blade members are arranged so as to be separated from each other along the circumferential direction of the tank.

3. The shot peening apparatus according to claim 1, wherein the hindering mechanism is disposed at a position above the suction port.

* * * * *